United States Patent
Suh et al.

(10) Patent No.: US 7,746,952 B2
(45) Date of Patent: Jun. 29, 2010

(54) APPARATUS FOR GENERATING PRECODING CODEBOOK FOR MIMO SYSTEM AND METHOD USING THE APPARATUS

(75) Inventors: Jung Hoon Suh, Yongin-si (KR); Sung Jin Kim, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 440 days.

(21) Appl. No.: 11/867,074

(22) Filed: Oct. 4, 2007

(65) Prior Publication Data

US 2008/0165876 A1 Jul. 10, 2008

Related U.S. Application Data

(60) Provisional application No. 60/883,867, filed on Jan. 8, 2007.

(30) Foreign Application Priority Data

Mar. 30, 2007 (KR) ............................... 2007-31531

(51) Int. Cl.
*H04B 7/02* (2006.01)

(52) U.S. Cl. ...................................... 375/267
(58) Field of Classification Search ................. 375/260, 375/267
See application file for complete search history.

(56) References Cited

U.S. PATENT DOCUMENTS

2008/0037669 A1* 2/2008 Pan et al. ..................... 375/260
2008/0267138 A1* 10/2008 Walton et al. ............... 370/336

* cited by examiner

*Primary Examiner*—Don N Vo
(74) *Attorney, Agent, or Firm*—NSIP Law (57) ABSTRACT

An apparatus and method to generate a precoding codebook for a Multiple-Input Multiple-Output (MIMO) system, the apparatus for generating a precoding codebook including: a clustering unit to collect a predetermined number of spatial beams into one cluster such that mutual interference is minimized, the predetermined number of spatial beams collected from among a plurality of spatial beams distributed to at least one user during a precoding process of a MIMO communication scheme; and a mapping table generator to generate a mapping table including one or more indexes generated based on information about the cluster, and a value of each element of the mapping table is generated based on interference between the clusters and/or whether overlapping of the clusters is allowed.

37 Claims, 4 Drawing Sheets

Table 310:
| 1 | (a,b),(c,d) |
|---|---|
| 2 | (a,b),(e,f) |
| 3 | (c,d),(a,b) |
| 4 | (c,d),(e,f) |
| 5 | (e,f),(a,b) |
| 6 | (e,f),(c,d) |

Table 320/330:
| 1 | 2 | 3 | 4 | 5 | 6 |
|---|---|---|---|---|---|
| (a,b),(c,d) | (a,b),(e,f) | (c,d),(a,b) | (c,d),(e,f) | (e,f),(a,b) | (e,f),(c,d) |
|   |   | 1 |   |   |   |
|   | 1 |   |   |   |   |
|   |   |   |   | 1 |   |
|   |   |   | 1 |   |   |
|   |   |   |   |   |   |
|   |   |   |   |   |   |

APPARATUS FOR GENERATING PRECODING CODEBOOK FOR MIMO SYSTEM AND METHOD USING THE APPARATUS

CROSS-REFERENCE TO RELATED APPLICATIONS

This application claims the benefit of U.S. Provisional Application No. 60/883,867, filed on Jan. 8, 2007 in the U.S. Patent and Trademark Office, and the benefit of Korean Application No. 2007-31531, filed on Mar. 30, 2007 in the Korean Intellectual Property Office, the disclosures of which are incorporated herein by reference.

BACKGROUND OF THE INVENTION

1. Field of the Invention

Aspects of the present invention relate to a wireless data communication system, and more particularly, to precoding in a Multiple-input Multiple-Output (MIMO) system.

2. Description of the Related Art

Precoding is a process of appropriately allocating users to each spatial beam in a space-division multiple access (SDMA) Multiple-Input Multiple-Output (MIMO) scheme.

Programmable preceding techniques are discussed in C30-20061030-064 draft that was published in a 3rd Generation Partnership Project 2 Ultra Mobile Broadband (3GPP2 UMB) standardization conference for next generation mobile communication. According to the C30-20061030-064 draft, a preceding matrix consists of a combination of clusters, and each terminal feeds back indexes of a table to a base station. In this instance, the table includes overlapping clusters.

However, it is difficult to calculate channel quality information (CQI) with respect to all available clusters. Accordingly, there is a need for some constraint on CQI for a simple calculation.

Also, when a base station determines a codebook, a terminal must unconditionally download the codebook without knowing a reliability and characteristics of the codebook. Accordingly, there is a need to form a feedback route so that the terminal can pre-verify the characteristics of the codebook, or so that the terminal can affect the characteristic of the codebook.

Also, conventional preceding techniques can be effective for a single user. However, the conventional precoding techniques have limitations in regards to allocating spatial beams in a multi-user communication system. Accordingly, there is a need for a development of a method to generate an effective programmable codebook in a preceding process for a MIMO system.

SUMMARY OF THE INVENTION

Aspects of the present invention provide an apparatus and method that utilize advantages of a programmable preceding codebook to effectively allocate resources in a multi-user communication system.

Aspects of the present invention also provide an apparatus and method to reduce overhead and system complexity in a multi-user space-division multiple access (SDMA) Multiple-Input Multiple-Output (MIMO) system.

According to an aspect of the present invention, there is provided an apparatus for generating a preceding codebook, the apparatus including: a clustering unit to collect a predetermined number of spatial beams into one cluster such that mutual interference is minimized, the predetermined number of spatial beams selected from among a plurality of spatial beams distributed to at least one user during a preceding process of a MIMO communication scheme; a mapping table generator to generate a mapping table including a plurality of elements and one or more indexes generated based on information about a plurality of clusters of the clustering unit, wherein a value of each element of the mapping table is based on whether overlapping of the plurality of clusters is allowed and/or interference between the plurality of clusters; and a codebook generator to select at least one cluster from the mapping table based on the value of each element of the mapping table, and generate a codebook from the selected at least one cluster.

According to another aspect of the present invention, there is provided a method of generating a precoding codebook, the method including: collecting a predetermined number of spatial beams into each of a plurality of clusters such that mutual interference is minimized, the predetermined number of spatial beams selected from among a plurality of spatial beams distributed to at least one user during a preceding process of a MIMO communication scheme; generating a mapping table including a plurality of elements and one or more indexes generated based on information about the plurality of clusters, wherein a value of each element of the mapping table is based on whether overlapping of the plurality of clusters is allowed and/or interference between the plurality of clusters; selecting at least one cluster from the mapping table based on the value of each element of the mapping table; and generating a codebook from the selected at least one cluster.

According to yet another aspect of the present invention, there is provided a system for generating and transmitting a preceding codebook, the system including: a base station to generate the preceding codebook, the base station including: a clustering unit to collect a predetermined number of spatial beams into one cluster such that mutual interference is minimized, the predetermined number of spatial beams selected from among a plurality of spatial beams distributed to at least one user during a preceding process of a Multiple-Input Multiple-Output (MIMO) communication scheme, a mapping table generator to generate a mapping table including a plurality of elements and one or more indexes generated based on information about a plurality of clusters of the clustering unit, wherein a value of each element of the mapping table is based on interference between the plurality of clusters and/or whether overlapping of the plurality of clusters is allowed, and a transmitter to select a transmitting cluster based on the mapping table and communication environment-based preferred cluster information, and to transmit data from via the transmitting cluster; and a terminal to download the preceding codebook from the base station, to receive the transmitted data from the base station via the transmitting cluster, and to transmit the communication environment-based preferred cluster information to the base station, wherein the transmitter selects the transmitting cluster to minimize interference with a neighboring terminal of the terminal.

According to still another aspect of the present invention, there is provided a method of generating and transmitting a preceding codebook, the method including: collecting a predetermined number of spatial beams into each of a plurality of clusters such that mutual interference is minimized, the predetermined number of spatial beams selected from among a plurality of spatial beams distributed to at least one user during a preceding process of a Multiple-Input Multiple-Output (MIMO) communication scheme; generating a mapping table including a plurality of elements and one or more indexes generated based on information about the plurality of clusters, wherein a value of each element of the mapping table is based on interference between the plurality of clusters and/or whether overlapping of the plurality of clusters is allowed; selecting a transmitting cluster based on the mapping table and communication environment-based preferred cluster information that is received from a terminal such that interference with a neighboring terminal is minimized; and transmitting data from a base station via the transmitting cluster.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
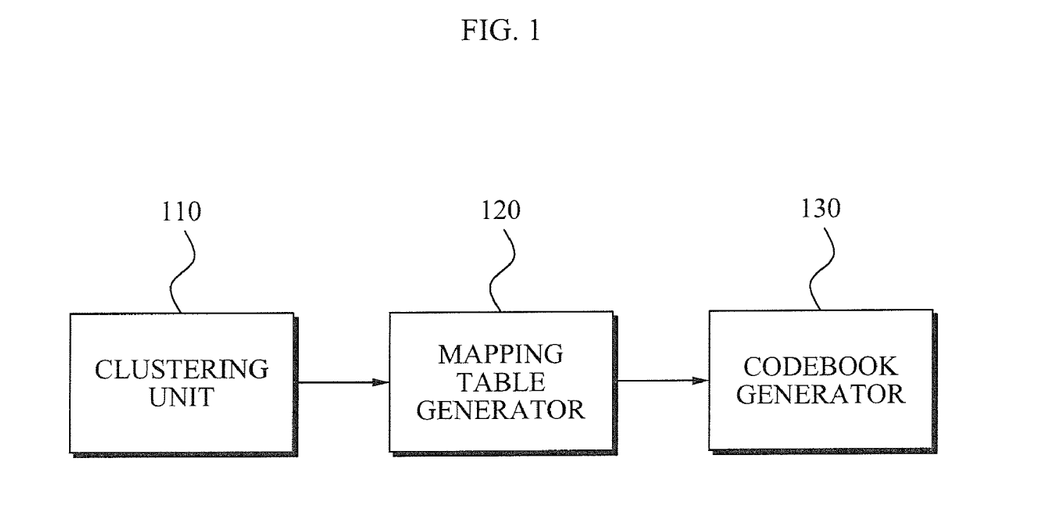
FIG. 1 is a block diagram illustrating an apparatus for generating a precoding codebook according to an embodiment of the present invention.

FIG. 1 is a block diagram illustrating an apparatus for generating a preceding codebook according to an embodiment of the present invention. Referring to FIG. 1, the apparatus for generating a preceding codebook includes a clustering unit 110 and a mapping table generator 120.

The clustering unit 110 collects a predetermined number of spatial beams into one cluster. The predetermined number of spatial beams is collected from among a plurality of spatial beams distributed to at least one user during a precoding process of a Multiple-Input Multiple-Output (MIMO) communication scheme. Mutual interference is minimized in the one cluster.

As described above, the plurality of spatial beams may be distributed to at least one user during the preceding process of the MIMO communication scheme. In this instance, the plurality of spatial beams is distributed to one user by cluster units. Also, the predetermined number of spatial beams is included in one cluster, and is selected to minimize the mutual interference. A number of spatial beams to be included in one cluster may be predetermined.

The mapping table generator 120 generates a mapping table. An index of the mapping table is generated based on information about the cluster, and a value of each element of the mapping table is generated based on interference between the clusters and/or whether overlapping of the clusters is allowed.

The codebook generator 130 to select at least one cluster from the mapping table based on the value of each element of the mapping table, and generate a codebook from the selected at least one cluster.

In the preceding process of the MIMO communication scheme, a plurality of clusters may be distributed to a single user. Alternatively, the plurality of clusters may be distributed to a plurality of users that are located in one cell coverage. In this case, overlapping of the plurality of clusters occurs. However, when the overlapping occurs, the overlapping is only allowed when there is no deterioration in a communication quality between a base station and a terminal information about whether the overlapping is allowed is included in the mapping table.

According to an aspect of the present invention, a combination of clusters that have the least mutual interference may be selected to optimize the communication quality.

In this case, the overlapping may be allowed only when the clusters are either orthogonal or nearly orthogonal to each other. When communication standards require that users must be orthogonal to each other, it is possible to improve a reliability of channel quality information (CQI) in a terminal and/or to reduce a calculation complexity without accurately knowing a beam of another user. When the communication standards express that users must be nearly orthogonal, an explicit standard regarding to what extent the overlapping is allowed should be specified.

Furthermore, when the terminal calculates a CQI regardless of selecting code vector, mutual orthogonality may be assumed. In this state, the CQI may be calculated. When the mutual orthogonality is either specified or assumed, the characteristics of the codebook may be pre-verified. Accordingly, in comparison to a calculation of the CQI when a receiver considers precoding of a codebook scheme, the CQI may be calculated with relatively fewer number of calculations.

In the conventional art, it is either unspecified or difficult to measure interference between clusters where overlapping is allowed. Moreover, the interference changes depending on a value of a beam or a cluster of which overlapping is allowed, which results in affecting a CQI calculation of the terminal. Accordingly, in the conventional art, the CQI may be predicted only when the terminal calculates every possible combination of clusters.

When each of a plurality of clusters is overlapped with one preferred cluster, a plurality of CQI values may be calculated. Thus, a plurality of average CQI values may be acquired. Accordingly, the accuracy of the CQI may be increased. Also, when average interference is calculated based on a beam or cluster of which overlapping is allowed, and then an expectation value is acquired, the accuracy of the CQI may be improved. However, the signal processing complexity of the terminal may be increased.

According to an embodiment of the present invention, it is possible to significantly reduce complexity when measuring and calculating the CQI. Also, since orthogonality is specified, it is possible to more accurately predict the CQI.

A correlation value with respect to interference between channels may be fed back together with a codebook when the terminal downloads the codebook. In this case, it may be possible to reduce an amount of calculations by the terminal. However, an amount of information to be downloaded may be increased.

Figure 2:
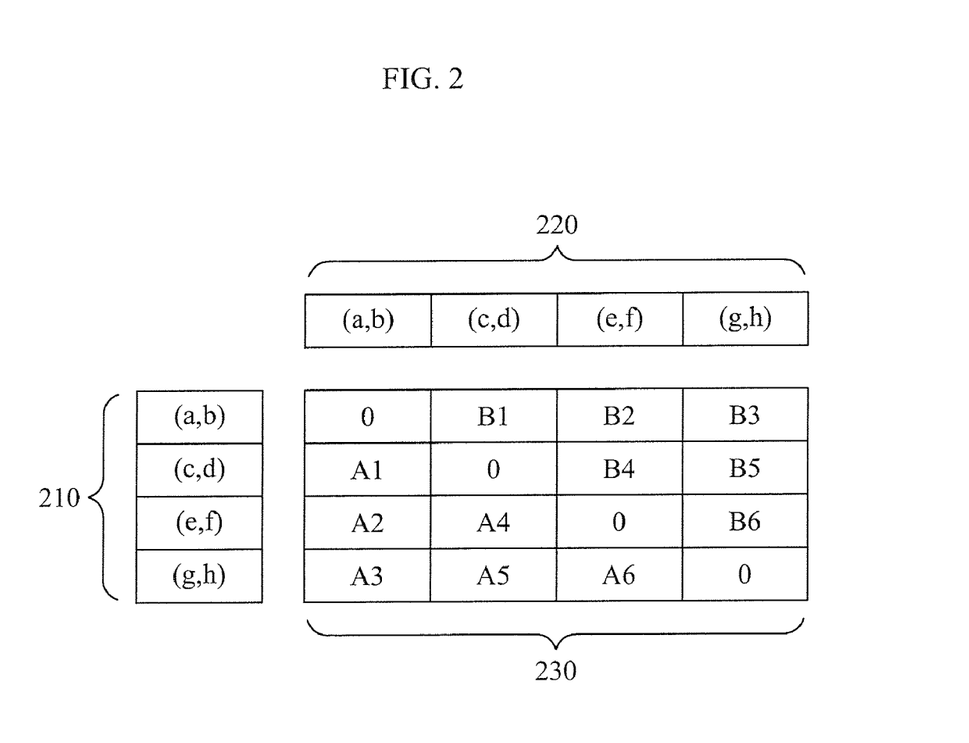
FIG. 2 illustrates an example of a mapping table generated by an apparatus and also a method of generating a precoding codebook according to an embodiment of the present invention.

FIG. 2 illustrates an example of a mapping table generated by an apparatus for generating a preceding codebook according to an embodiment of the present invention. Referring to FIG. 2, the mapping table includes indexes 210 and 220 and a group of elements 230 corresponding to the indexes 210 and 220. A value of each of the elements 230 is generated based on interference between the clusters and/or whether overlapping of the clusters is allowed. Referring to the indexes 210 and 220, (a, b), (c, d), (e, f), and (g, h) each correspond to a cluster. Also, a, b, c, d, e, f, g, and h each indicate a spatial beam.

In the mapping table illustrated in FIG. 2, two spatial beams are included in one cluster, and four clusters are provided. However, it is understood that more or less than two spatial beams may be included in each cluster, and more or less than four clusters may be provided. Overlapping is not allowed between the same clusters. Therefore, a value of diagonal elements corresponding to the same clusters is 0.

A1 indicates a value corresponding to interference when overlapping occurs between the clusters (a, b) and (c, d). Alternatively (or additionally), A1 indicates a value corresponding to whether the overlapping is allowed. B1 indicates a value corresponding to interference when overlapping occurs between the clusters (c, d) and (a, b). Alternatively (or additionally), B1 indicates a value corresponding to whether the overlapping is allowed. Accordingly, A1 and B1 have the same value. Similarly, A2=B2. That is, Ai=Bi when i=1, 2, 3, 4, 5, 6, etc.

When defining the mapping table, each of the diagonal elements has a value of 0, as described above. Furthermore, elements that are located above a diagonal line are symmetric to elements that are located below the diagonal line. Accordingly, when storing values of elements of the mapping table, the mapping table may store only the values of elements that are located above the diagonal line or below the diagonal line, as opposed to all of the elements both above the diagonal line and below the diagonal line.

In the conventional art, a space of (a number of clusters)×(a number of clusters) is needed to store the values of the elements of the mapping table. However, according to an aspect of the present invention, a space of (a number of clusters)×(a number of clusters)/2−(a number of clusters) is sufficient. Therefore, it is possible to reduce an amount of data when a mobile terminal feeds back data via an uplink.

Referring again to FIG. 1, the apparatus for generating a preceding codebook includes the clustering unit 110 and the mapping table generator 120. The interference between clusters may be acquired based on data fed back from a terminal with respect to a pilot signal.

Also, the apparatus for generating a precoding codebook may further include a transmitter to select a transmitting cluster based on the mapping table and communication environment-based cluster information that is received from the terminal, and to transmit data from a base station. In this instance, the transmitting cluster is capable of minimizing interference with a neighboring terminal.

Also, the preferred cluster may be determined based on a geographical characteristic within the cell coverage or a relative location of the terminal within the cell coverage. Furthermore, the transmitter selects the transmitting cluster capable of minimizing interference with the neighboring terminal, among preferred clusters of each terminal, and distributes the selected cluster to each terminal. Then, the transmitter transmits data from the base station via the distributed cluster.

Figure 3:
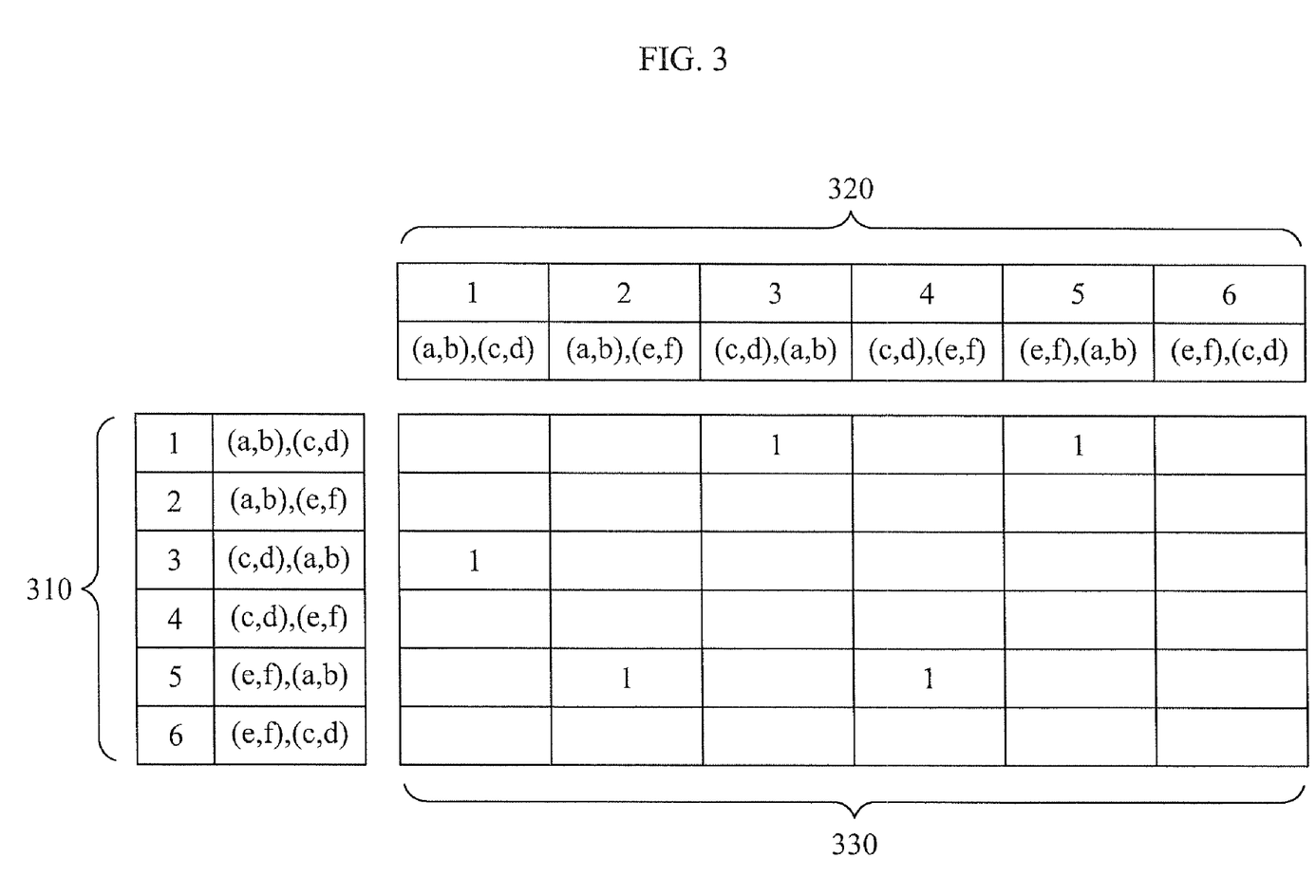
FIG. 3 illustrates an example of a mapping table generated by an apparatus and also a method of generating a preceding codebook according to another embodiment of the present invention.

FIG. 3 illustrates an example of a mapping table generated by an apparatus for generating a preceding codebook according to another embodiment of the present invention. Referring to FIG. 3, the mapping table is based on three clusters ((a,b), (c,d), and (d,e)), and includes indexes 310 and 320 and a group of elements 330 corresponding to the indexes 310 and 320.

According to an aspect of the present invention, a combination of clusters may be utilized for the indexes 310 and 320. Also, a value of each of the elements 330 is generated based on interference between the combinations of the clusters and/or whether overlapping of the combinations of the clusters is allowed.

The combination of clusters includes a first preferred cluster and a second preferred cluster. The first preferred cluster indicates a cluster that is preferred by a terminal due, for example, to a location of the terminal or a geographical characteristic in the cell coverage. The second preferred cluster indicates a cluster that has the minimum interference with the first preferred cluster, thus allowing overlapping.

When feeding back the first preferred cluster and the second preferred cluster together, the performance of a preceding system may be further improved. In this instance, the second preferred cluster is preferred as a pair of overlapping clusters. Also, when the first preferred cluster is being utilized by another terminal, an optimal cluster may be selected from the second preferred clusters by the mapping table and, as a result, the communication quality may be improved.

For the above operation, a condition of the first preferred cluster may be different based on the second preferred cluster. Thus, the first preferred cluster is repeatedly applied as many times as a pattern of the second preferred cluster.

In this instance, for each feedback, a value of each of the elements 330 of the mapping table may reflect results of the feedback and thereby be updated. Also, the value of each of the elements 330 of the mapping table may be updated previously and utilize the results of the feedback.

Figure 5:
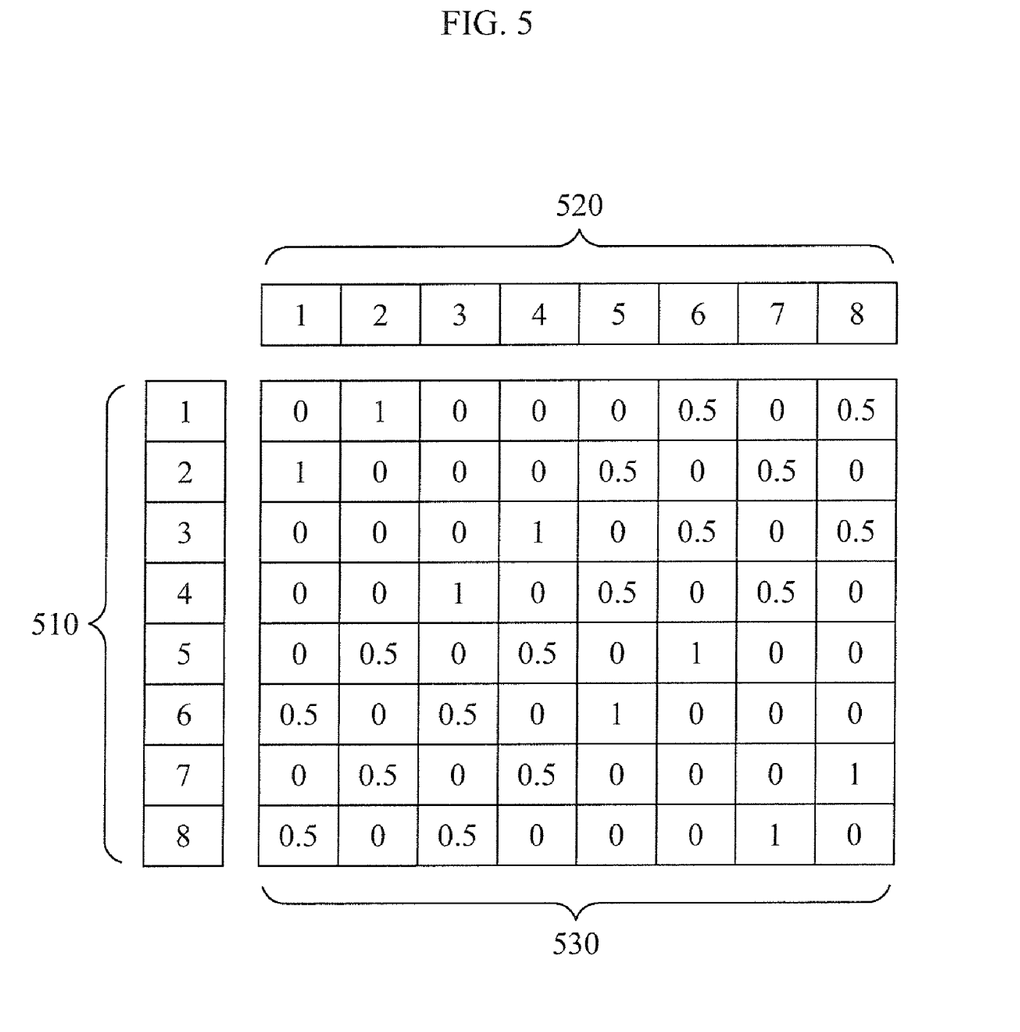
FIG. 5 illustrates an example of a mapping table generated by an apparatus or a method of generating a preceding codebook according to still another embodiment of the present invention.

FIG. 5 illustrates an example of a mapping table generated by an apparatus for generating a preceding codebook according to still another embodiment of the present invention. Referring to FIG. 5, the mapping table is based on eight clusters (1, 2, 3, 4, 5, 6, 7, and 8), and includes indexes 510 and 520 and a group of elements 530 corresponding to the indexes 510 and 520.

A value of each of the elements of the mapping table may have any one of real numbers from 0 to 1 based on interference between the clusters and/or whether overlapping of the clusters is allowed.

0 indicates a value corresponding to a pair of clusters of which overlapping is not allowed, and 1 indicates a value corresponding to a pair of clusters of which overlapping is most preferred. That is, the closer that the value is to 0, the less preferred the overlapping is. Conversely, the closer the value is to 1, the more preferred the overlapping is.

Figure 4:
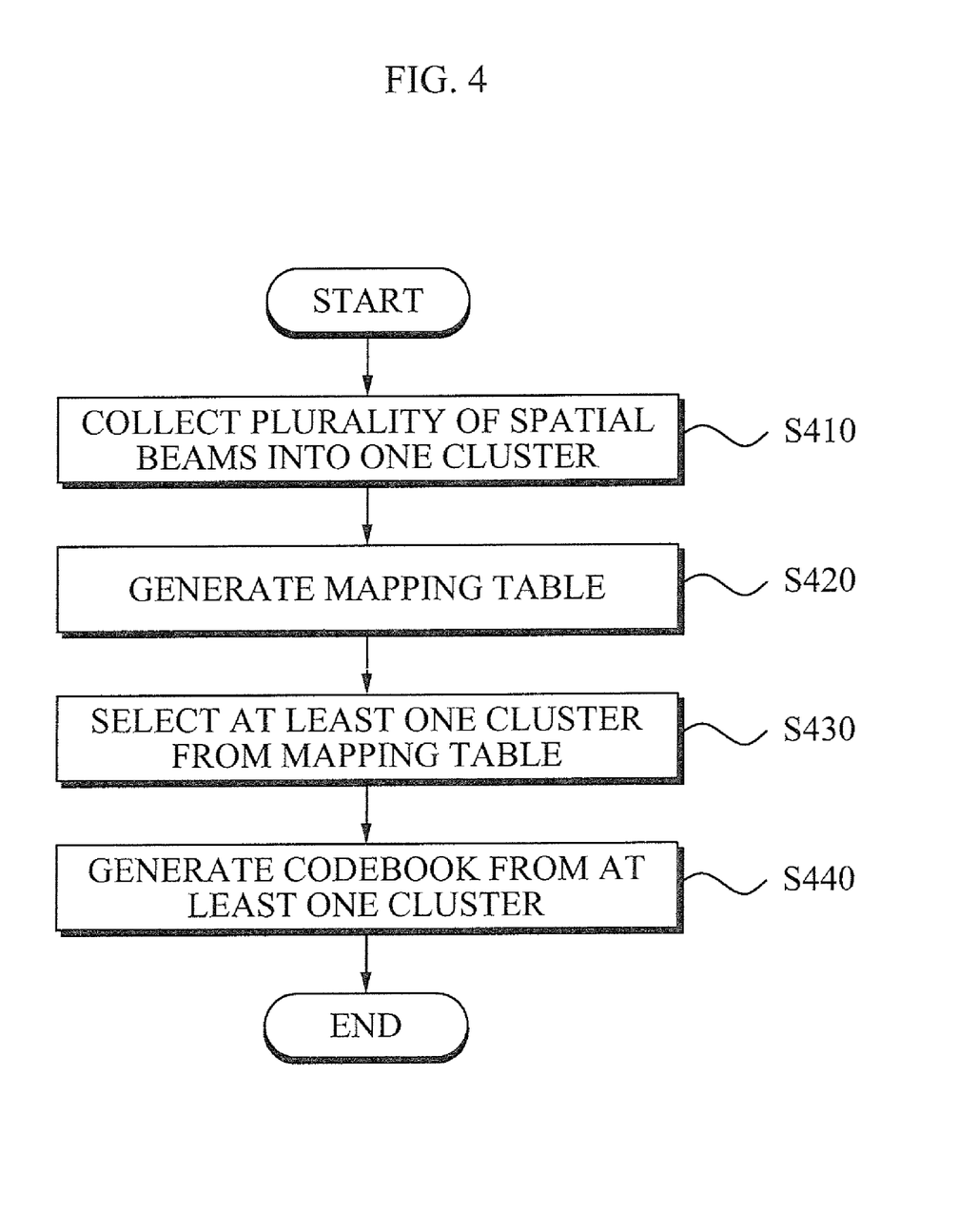
FIG. 4 is a flowchart illustrating a method of generating a preceding codebook according to an embodiment of the present invention.

FIG. 4 is a flowchart illustrating a method of generating a preceding codebook according to an embodiment of the present invention. Referring to FIG. 4, in operation S410, a predetermined number of spatial beams is collected into one cluster. The predetermined number of spatial beams is collected from among a plurality of spatial beams distributed to at least one user during a preceding process of a MIMO communication scheme. Mutual interference is minimized in the one cluster.

As described above, the plurality of spatial beams may be distributed to at least one user during the preceding process of the MIMO communication scheme in this instance, the plurality of spatial beams is distributed to one user by cluster units. Also, the predetermined number of spatial beams is included in one cluster, and is selected to minimize the mutual interference. A number of spatial beams to be included in one cluster may be predetermined.

Next, in operation S420, a mapping table including one or more indexes is generated based on information about the cluster, and a value of each element of the mapping table is generated based on interference between the clusters and/or whether overlapping of the clusters is allowed.

In operation S430, at least one cluster is selected from the mapping table based on the value of each element of the mapping table.

In operation S440, a codebook is generated from the selected at least one cluster.

In the preceding process of the MIMO communication scheme, a plurality of clusters may be distributed to a single user. Also, the plurality of clusters may be distributed to a plurality of users that are located in one cell coverage. In this instance, overlapping of the plurality of clusters occurs.

Even though the overlapping occurs, the overlapping is only allowed when there is no deterioration in communication quality between a base station and a terminal. Information about whether the overlapping is allowed is included in the mapping table.

According to an aspect of the present invention, a combination of clusters that have the least mutual interference may be selected to optimize the communication quality.

The overlapping may be allowed only when the clusters are either orthogonal or nearly orthogonal to each other. Specifically, when communication standards require that users must be orthogonal to each other, it is possible to improve reliability of a CQI in a terminal or to reduce calculation complexity without accurately knowing a beam of another user. When the communication standards express that users must be nearly orthogonal, an explicit standard regarding to what extent the overlapping is allowed should be specified.

Also, when the terminal calculates CQI regardless of selecting code vector, mutual orthogonality may be assumed. In this state, the CQI may be calculated. When the mutual orthogonality is either specified or assumed, the characteristics of the codebook may be pre-verified. Accordingly, in comparison to a calculation of the CQI when a receiver considers precoding of a codebook scheme, the CQI may be calculated with a relatively fewer number of calculations.

In the conventional art, it is either unspecified or difficult to measure an interference between clusters where overlapping is allowed. Moreover, the interference changes depending on a value of a beam or a cluster of which overlapping is allowed, which results in affecting a CQI calculation of the terminal. Accordingly, in the conventional art, the CQI may be predicted only when the terminal calculates every possible combination of clusters.

When each of a plurality of clusters is overlapped with one preferred cluster, a plurality of CQI values may be calculated. Thus, a plurality of average CQI values may be acquired. Accordingly, the accuracy of the CQI may be increased. Also, when average interference is calculated based on a beam or cluster of which overlapping is allowed, and then an expectation value is acquired, the accuracy of the CQI may be improved. However, the signal processing complexity of the terminal may be increased.

According to an embodiment of the present invention, it is possible to significantly reduce complexity when measuring and calculating the CQI. Also, since orthogonality is specified, it is possible to more accurately predict the CQI.

Also, the method of generating a preceding codebook may further include downloading the generated preceding codebook from a base station to a terminal. In this case, a correlation value with respect to interference between channels may be fed back together with a codebook when the terminal downloads the codebook. Therefore, it may be possible to reduce an amount of calculations by the terminal. However, an amount of information to be downloaded may be increased.

The preceding codebook generating method according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave comprising a compression source code segment and an encryption source code segment (such as data transmission through the Internet). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, it is possible to utilize a programmable preceding codebook to effectively allocate resources in a multi-user communication system. Also, according to aspects of the present invention, it is possible to reduce overhead and system complexity in a multi-user space-division multiple access (SDMA) MIMO system.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. An apparatus for generating a precoding codebook, the apparatus comprising:

a clustering unit to collect a predetermined number of spatial beams into one cluster such that mutual interference is minimized, the predetermined number of spatial beams selected from among a plurality of spatial beams distributed to at least one user during a preceding process of a Multiple-Input Multiple-Output (MIMO) communication scheme;

a mapping table generator to generate a mapping table including a plurality of elements and one or more indexes generated based on information about a plurality of clusters of the clustering unit, wherein a value of each element of the mapping table is based on interference between the plurality of clusters and/or whether overlapping of the plurality of clusters is allowed; and a codebook generator to select at least one cluster from the mapping table based on the value of each element of the mapping table, and generate a codebook from the selected at least one cluster.

2. The apparatus as claimed in claim 1, wherein the interference between the plurality of clusters is determined based on feedback data that is received from a terminal with respect to a pilot signal.

3. The apparatus as claimed in claim 1, further comprising:
a transmitter to select a transmitting cluster based on the mapping table and communication environment-based preferred cluster information that is received from a terminal, and to transmit data from a base station via the transmitting cluster,
wherein the transmitter selects the transmitting cluster to minimize interference with a neighboring terminal.

4. The apparatus as claimed in claim 1, wherein the value of each element of the mapping table is based on interference between two corresponding clusters of the one or more indexes and/or whether overlapping of the two corresponding clusters is allowed.

5. The apparatus as claimed in claim 4, wherein the mapping table comprises a first index of the plurality of clusters and a second index of the plurality of clusters, such that each element of the mapping table is generated based on an interference between a corresponding cluster of the first index and a corresponding cluster of the second index.

6. The apparatus as claimed in claim 1, wherein a value of each element of the mapping table is a real number from 0 to 1 according to the interference between the plurality of clusters and/or whether overlapping of the plurality of clusters is allowed.

7. The apparatus as claimed in claim 1, wherein overlapping is allowed only when the plurality of clusters are orthogonal or nearly orthogonal to each other.

8. The apparatus as claimed in claim 1, wherein the mapping table only stores values of elements that are located in one of an upper portion and a lower portion of a diagonal line that crosses the mapping table, not including values of elements on the diagonal line.

9. The apparatus as claimed in claim 1, wherein the one or more indexes comprise a plurality of cluster combinations.

10. The apparatus as claimed in claim 9, wherein each cluster combination comprises:
a first preferred cluster that is preferred by a terminal due to a location of the terminal or a geographical characteristic in a cell coverage; and
a second preferred cluster that has a minimum interference with the first preferred cluster.

11. A method of generating a preceding codebook, the method comprising:
collecting a predetermined number of spatial beams into each of a plurality of clusters such that mutual interference is minimized, the predetermined number of spatial beams selected from among a plurality of spatial beams distributed to at least one user during a preceding process of a Multiple-input Multiple-Output (MIMO) communication scheme; generating a mapping table including a plurality of elements and one or more indexes generated based on information about the plurality of clusters, wherein a value of each element of the mapping table is based on interference between the plurality of clusters and/or whether overlapping of the plurality of clusters is allowed;
selecting at least one cluster from the mapping table based on the value of each element of the mapping table; and
generating a codebook from the selected at least one cluster.

12. The method as claimed in claim 11, wherein the interference between the clusters is determined based on feedback data that is received from a terminal with respect to a pilot signal.

13. The method as claimed in claim 11, further comprising:
selecting a transmitting cluster based on the mapping table and communication environment-based preferred cluster information that is received from a terminal such that interference with a neighboring terminal is minimized; and
transmitting data from a base station via the transmitting cluster.

14. The method as claimed in claim 11, wherein the value of each element of the mapping table is based on interference between two corresponding clusters of the one or more indexes and/or whether overlapping of the two corresponding clusters is allowed.

15. The method as claimed in claim 14, wherein the mapping table comprises a first index of the plurality of clusters and a second index of the plurality of clusters, such that each element of the mapping table is generated based on an interference between a corresponding cluster of the first index and a corresponding cluster of the second index.

16. The method as claimed in claim 11, wherein a value of each element of the mapping table is a real number from 0 to 1 according to the interference between the plurality of clusters and/or whether overlapping of the plurality of clusters is allowed.

17. The method as claimed in claim 11, wherein overlapping is allowed only when the plurality of clusters are orthogonal or nearly orthogonal to each other.

18. The method as claimed in claim 11, wherein the mapping table only stores values of elements that are located in one of an upper portion and a lower portion of a diagonal line that crosses the mapping table, not including values of elements on the diagonal line.

19. The method as claimed in claim 11, wherein the one or more indexes comprise a plurality of cluster combinations.

20. The method as claimed in claim 19, wherein each cluster combination comprises:
a first preferred cluster that is preferred by a terminal due to a location of the terminal or a geographical characteristic in a cell coverage; and
a second preferred cluster that has a minimum interference with the first preferred cluster.

21. The method as claimed in claim 13, further comprising:
downloading the generated precoding codebook from the base station to the terminal.

22. The method as claimed in claim 21, wherein the downloading of the generated precoding codebook comprises:
transmitting a correlation value of an interference channel from the base station to the terminal.

23. A computer readable recording medium encoded with the method of claim 11 and implemented by a computer.

24. A system for generating and transmitting a precoding codebook, the system comprising:
a base station to generate the preceding codebook, the base station comprising:
a clustering unit to collect a predetermined number of spatial beams into one cluster such that mutual interference is minimized, the predetermined number of spatial beams selected from among a plurality of spatial beams distributed to at least one user during a preceding process of a Multiple-Input Multiple-Output (MIMO) communication scheme,
a mapping table generator to generate a mapping table including a plurality of elements and one or more indexes generated based on information about a plurality of clusters of the clustering unit, wherein a value of each element of the mapping table is based on interference between the plurality of clusters and/or whether overlapping of the plurality of clusters is allowed, and a transmitter to select a transmitting cluster based on the mapping table and communication environment-based preferred cluster information, and to transmit data from via the transmitting cluster; and a terminal to download the preceding codebook from the base station, to receive the transmitted data from the base station via the transmitting cluster, and to transmit the communication environment-based preferred cluster information to the base station, wherein the transmitter selects the transmitting cluster to minimize interference with a neighboring terminal of the terminal.

25. The system as claimed in claim 24, wherein the interference between the plurality of clusters is determined based on feedback data that is received from the terminal with respect to a pilot signal.

26. The system as claimed in claim 24, wherein the value of each element of the mapping table is based on interference between two corresponding clusters of the one or more indexes and/or whether overlapping of the two corresponding clusters is allowed.

27. The system as claimed in claim 26, wherein the mapping table comprises a first index of the plurality of clusters and a second index of the plurality of clusters, such that each element of the mapping table is generated based on an interference between a corresponding cluster of the first index and a corresponding cluster of the second index.

28. The system as claimed in claim 24, wherein overlapping is allowed only when the plurality of clusters are orthogonal or nearly orthogonal to each other.

29. The system as claimed in claim 24, wherein the mapping table only stores values of elements that are located in one of an upper portion and a lower portion of a diagonal line that crosses the mapping table, not including values of elements on the diagonal line.

30. The system as claimed in claim 24, wherein the transmitter transmits a correlation value of an interference channel from the base station to the terminal.

31. A method of generating and transmitting a preceding codebook, the method comprising:

collecting a predetermined number of spatial beams into each of a plurality of clusters such that mutual interference is minimized, the predetermined number of spatial beams selected from among a plurality of spatial beams distributed to at least one user during a preceding process of a Multiple-Input Multiple-Output (MIMO) communication scheme;

generating a mapping table including a plurality of elements and one or more indexes generated based on information about the plurality of clusters, wherein a value of each element of the mapping table is based on interference between the plurality of clusters and/or whether overlapping of the plurality of clusters is allowed;

selecting a transmitting cluster based on the mapping table and communication environment-based preferred cluster information that is received from a terminal such that interference with a neighboring terminal is minimized; and transmitting data from a base station via the transmitting cluster.

32. The method as claimed in claim 31, wherein the value of each element of the mapping table is based on interference between two corresponding clusters of the one or more indexes and/or whether overlapping of the two corresponding clusters is allowed.

33. The method as claimed in claim 32, wherein the mapping table comprises a first index of the plurality of clusters and a second index of the plurality of clusters, such that each element of the mapping table is generated based on an interference between a corresponding cluster of the first index and a corresponding cluster of the second index.

34. The method as claimed in claim 31, wherein overlapping is allowed only when the plurality of clusters are orthogonal or nearly orthogonal to each other.

35. The method as claimed in claim 31, further comprising:
downloading the generated preceding codebook from the base station to the terminal.

36. The method as claimed in claim 35, wherein the downloading of the generated preceding codebook comprises:
transmitting a correlation value of an interference channel from the base station to the terminal.

37. A computer readable recording medium encoded with the method of claim 31 and implemented by a computer.

* * * * *